United States Patent [19]
Duff et al.
[11] Patent Number: 4,803,119
[45] Date of Patent: Feb. 7, 1989

[54] INK COMPOSITIONS FOR IMPACT TYPEWRITER RIBBONS

[75] Inventors: James M. Duff, Mississauga; Stephan Drappel; James D. Mayo, both of Toronto, all of Canada; Richard G. Crystal, Los Altos, Calif.

[73] Assignee: Xerox Corporation, Stamford, Conn.

[21] Appl. No.: 56,172

[22] Filed: Jun. 1, 1987

[51] Int. Cl.[4] .................................... B32B 3/26

[52] U.S. Cl. .............................. 428/321.3; 428/207; 428/335; 428/474.4; 428/475.2; 428/480; 428/483; 428/500; 428/522; 428/914

[58] Field of Search .................... 428/321.3, 914, 195, 428/207, 335, 474.4, 475.2, 480, 483, 500, 522; 521/73, 88, 97

[56] References Cited

U.S. PATENT DOCUMENTS 3,440,083 4/1969 Fleming et al. .................... 117/63
4,515,489 5/1985 Kohle et al. .................... 400/241.2
4,713,281 12/1987 Shini .................................. 428/321.3

FOREIGN PATENT DOCUMENTS 5088 7/1978 Japan .................................. 428/321.3
114991 4/1981 Japan .................................. 428/321.3
2118584 4/1985 United Kingdom ............. 428/321.3

OTHER PUBLICATIONS

IBM Tech. Disclosure Bulletin, vol. 15, No. 2, Jul. 1972, Findlay et al., "Ribbon Support Film Coating".

*Primary Examiner*—Ellis P. Robinson
*Assistant Examiner*—P. R. Schwartz
*Attorney, Agent, or Firm*—E. O. Palazzo

[57] ABSTRACT

Disclosed is an ink coating composition for impact printing ribbons comprised of a sponge with an ink composition dispersed therein, which ink is comprised of pigment particles and a dimer acid.

20 Claims, No Drawings

INK COMPOSITIONS FOR IMPACT TYPEWRITER RIBBONS

BACKGROUND OF THE INVENTION

This invention relates generally to ink compositions, and more specifically to viscous ink compositions having incorporated therein, for example, dimer acids. In one embodiment, the ink compositions of the present invention are comprised of a sponge component such as a polymer and dispersed therein pigment particles, dimer acids, and other components as illustrated herein including dyes, which inks can, for example, be coated onto various substrates inclusive of polyesters from a single solvent process to enable the preparation of, for example, multistrike typewriter ribbons useful in imaging and printing processes. Additionally, in a further aspect of the present invention there are provided improved processes for affecting the preparation of multistrike typewriter ribbons. These processes are simple in design, and economically attractive; and furthermore, the solvent selected can be easily recovered in a high purity of about 99 percent. Moreover, the aforementioned processes enable multistrike typewriter ribbons with controlled pore size and density permitting, for example, the fabrication of ribbons especially useful with the high viscosity inks disclosed hereinafter. In addition, a further advantage associated with the inks of the present invention resides in the elimination of an adhesive layer between the supporting films such as Mylar polyesters and the sponge containing the ink dispersed therein.

Multistrike typewriter ribbons are known, reference for example U.K. Patent Publication No. 2,118,584, the disclosure of which is totally incorporated herein by reference. This publication discloses overlapping, overstrikeable typewriter ribbons or print ribbons, especially useful with daisy wheel typewriters and printers. It is indicated in this publication that overstrike ribbons consisting of a thin carrier film onto which an ink releasing coating is applied in the form of a matrix consisting of a plastics binder and an ink paste dispersed therein are known. The ink paste selected is generally comprised of an oil that is substantially incompatible with the plastic of the matrix and the colored pigments. As illustrated in this publication, an important requirement of overstrike ribbons is that at each character strike the same amount of ink paste should emerge from the ink release coating at every location on the ribbon. Typewriter ribbons are prepared in accordance with the teachings illustrated in the British publication by solution coating a mixture of a binder having an ink therein onto a carrier film comprised of, for example, polyesters, polyethylenes, polypropylenes, or polyamides. These processes select the known two solvent system, for example, a combination of methyl ethyl ketone, which has a boiling point of 80° C. and thus functions as a solvent for the binder selected, and toluene with a boiling point of 111° C. Disadvantages associated with the known two solvent systems for obtaining multistrike typewriter ribbons is the requirement that, for example, the toluene and methyl ethyl ketone components usually selected be removed by heating the formulated ribbons at a temperature equal to or greater than the boiling point of the solvent. As the solvent is removed, the polymer binder and ink, which are incompatible with each other, form a two phase system consisting of a continuous, foam or sponge-like matrix with the binder material adhering to the carrier film and the ink uniformly dispersed in the pores of the sponge. The pore size and pore density, that is for example the number of pores per unit area, are design factors which can influence the performance of the ribbon in a given printing system. Generally, a temperature of about 150° C. is needed to remove the toluene, and this temperature is much higher than the glass transition temperature of the polymer matrix. For example, a commercially utilized component, Union Carbide's VYHH a vinyl chloride/vinyl acetate copolymer, has a glass transition temperature Tg of 72° C. The aforementioned high temperature treatment and the air velocity of the dryer selected causes local imbalances in the ink/polymer ratio resulting in undesirable ribbons with an inhomogeneous structure. Further, upon depletion of the solvent, methyl ethyl ketone from the coating mixture, the polymer binder remains in the nonsolvent toluene, and is thus converted to a gelled state creating difficulties in formulating ribbons with controlled pore sizes and desirable pore densities. For example, the typewriter ribbon resulting usually has very few large pores, that is from about 5 to about 20 pores per 100 square micrometer of from about 5 to about 15 micrometers in size as compared to the needed about 50 to about 80 pores per 100 square micrometer of 1 to about 3 micrometers in size diameter. The large pore size generally causes a quick ink release upon impact, and the ribbon possesses a poor overstrike capability. With the process of the present invention wherein there is selected a single solvent system, the ink is comprised of the components as illustrated, the aforementioned problems are substantially eliminated.

Additionally, there is illustrated in U.S. Pat. No. 4,515,489 a print transfer ribbon for use with high velocity printing devices such as print wheels. Specifically, there is disclosed in this patent an overstrike ribbon with multiple overstrike capacity, at least a five fold overstrike capacity, which comprises a synthetic resin carrier foil provided on a surface adapted to confront a paper substrate with a color transfer layer, the color transfer layer consisting of the synthetic resin binder matrix, and dispersed in this matrix interconnecting droplets of an oil based coloring matter which can be partly extruded by impact of a typeface there against the substrate. The oil base coloring material selected contains at least one oil dispersable coloring agent or pigment, at least one filler, and at least one wetting agent.

Other prior art of interests includes U.S. Pat. No. 3,440,083 relating to pressure sensitive foils obtained from a coating containing a plastic resin and an opacifier compound; Japanese Ricoh Patent Publication 59-5088 describing an ink resin comprised of a film base, an adhesive layer and an ink layer with ink particles and a binder; IBM Technical Disclosure Bulletin Abstract, Vol. 15, No. 2, July 1972, which illustrates a ribbon support film coating comprised of a resin blend of polyesters, Teflon ®, and glycerol, and that the formulation is applied from a methyl ethyl ketone solvent; and Japanese No. 58114-991-A which discloses an electrorecording stencil paper comprised of a polyurethane resin and carbon black, and wherein the paper is prepared by dispersing carbon black in a solvent solution of a polyurethane resin, examples of solvents being methyl ethyl ketone, toluene and dimethyl formamide. In contrast, the ink coating compositions of the present invention are comprised of, for example, dimer acids and pigment particles.

Although the typewriter ribbons and ink formulations disclosed in the prior art are suitable in many situations for their desired purposes, there remains a need for new inks. Also, there is a need for high viscosity inks useful in imaging and printing processes. Furthermore, there is a need for highly viscous inks containing therein dimer acids, trimer acids, or mixtures thereof. There is also a need for simple economically attractive processes that will enable the formulation of multistrike typewriter ribbons. Furthermore, there is a need for the formulation of multistrike typewriter ribbons wherein the disadvantages associated with the two solvent system process of the prior art are eliminated, and wherein there is selected only one solvent. Also, there is a need for processes enabling multistrike typewriter ribbons wherein the polymer selected maintains its characteristics and does not convert to a gelatin stage during and upon completion of removal of the solvent from the coating mixture. Moreover, there continues to be a need for processes for multistrike typewriter ribbons wherein the ribbon resulting has a substantial number of pores with excellent pore density, and relatively uniform pore size.

There also remains a need for a simplified coating process and the recovering of the solvents selected for the aforementioned process without the necessity of having to separate two or more solvent mixtures selected in many of the prior art processes, and in several commercial processes for formulating typewriter multistrike ribbons. Moreover, there is a need for processes that will enable ribbons that can be selected for incorporation into various printers and typewriters using different impact forces and dwell times of the character as it impinges on the back of the ribbon by, for example, varying the ink viscosity and the polymer to ink ratio.

SUMMARY OF THE INVENTION

It is an object of the present invention to provide ink compositions which overcome some of the above-noted disadvantages.

In another object of the present invention there are provided processes for the formulation of multistrike typewriter ribbons.

Moreover, in another object of the present invention there are provided inks useful for printing ribbons, especially impact typewriter ribbons, which inks are comprised of a sponge such as a polymer having dispersed therein an ink composition comprised of pigment particles, a dimer acid or a trimer acid, and mixtures thereof, coated on a base film.

In addition, another object of the present invention resides in ink compositions comprised of pigment particles, dimer acids, dyes, and other additive particles as illustrated herein, which inks are dispersed in a polymer with a porous open celled sponge like structure.

Furthermore, in another object of the present invention there are provided high viscosity inks useful for high overstrike capability in multistrike typewriter ribbons.

Another object of the present invention resides in highly viscous inks containing dimer acids, trimer acids, or mixtures thereof.

Also, it is a further object of the present invention to provide inks that include black dyes such as induline oleate that are soluble in the dimer acid, and which serve to increase the covering power of the ink.

Additionally, in a further object of the present invention there are provided processes for obtaining multistrike typewriter ribbons wherein one solvent is selected.

Furthermore, in still another object of the present invention there are provided multistrike typewriter ribbon processes wherein the solvent selected can be easily recoverable in high purity.

Another object of the present invention resides in processes for obtaining an improved multistrike typewriter ribbon with a substantial number of pores present therein and excellent pore density.

Also, in a further object of the present invention there are provided processes for obtaining multistrike typewriter ribbons wherein the pore size and density can be preselected and controlled as desired.

Additionally, in still another object of the present invention there are provided multistrike typewriter ribbon processes wherein there is a residence time of from about 20 to about 30 seconds prior to drying, but subsequent to coating; and wherein during this period there is minimal air flow thereby allowing a uniform phase separation between the ink and sponge polymer matrix to occur, and wherein the resulting sponge possesses a small pore size of from about 1 to about 2 microns, and a high uniform pore density of from about 50 to about 75 pores per 100 square microns.

These and other objects of the present invention are accomplished by the provision of ink compositions with highly viscous characteristics. Thus, in an embodiment of the present invention there is provided an ink coating composition for impact printing ribbons comprised of a sponge with an ink composition dispersed therein, which ink is comprised of pigment particles and a dimer acid. More specifically, in one embodiment of the present invention there is provided an ink composition with a viscosity of from 5,000 to about 25,000 centipoise comprised of pigment particles and dimer acids dispersed in a sponge. Specifically, in one embodiment of the present invention the ink compositions are comprised of pigment particles such as carbon black, dimer acids available from Emery Industries; and other additives inclusive of induline oleate dyes, polyethylene glycols, and methyl ethyl ketone, which components are admixed with or dispersed in a polymer sponge such as a vinyl chloride/vinyl acetate copolymer available from Union Carbide. These ink compositions and others illustrated herein enable a paste like ink permitting delivery of a minimal amount thereof and a specific impact time thereby enabling, for example, a 10X to 12X overstrike ribbon for a conventional printer such as the Xerox 630 printer as compared to, for example, the present overstrike capacity of about 6X achieved with commercially available multistrike typewriter ribbons. With further respect to the overstrike capacity, it is known that in impact printers ribbons are advanced with each print of a character, thus for example a single strike ribbon will move the complete width of a character after each strike. In a multistrike ribbon system, the ribbon is advanced only partially enabling overstrike to occur and wherein the overstrike number X is the number of times the area is struck before the ribbon moves the entire width of the character, which is usually achieved by moving the ribbon only a fraction of the calculated distance.

Illustrative examples of polymers in the form of a sponge, formulated by the phase separation of a polymer selected from the coating solution containing for example a solvent, polymer, and pigment particles as more fully illustrated hereinafter, utilized for the ink compositions of the present invention include vinyl polymers, polyacrylates, polyvinyl chloride-vinylacetate copolymers, polyesters, especially liner polyesters, polystyrene copolymers, polyimides, polyvinyl acetates, and the like with the polymers available from Union Carbide as VYHH, which is believed to be a copolymer of vinyl chloride, 86 percent by weight, and 14 percent by weight of vinyl acetate, which polymer is believed to have a molecular weight of about 14,000 being particularly preferred. These polymers, which are as indicated herein in the form of a sponge thus permitting complete dispersing of the ink composition therein, are usually present in the final ink dry coating in an amount of from about 25 percent by weight to about 45 percent by weight; and preferably in an amount of from about 30 percent by weight to about 40 percent by weight.

With respect to the ink compositions dispersed in the aforementioned polymer sponge, it is comprised, as indicated herein, of pigment particles and, for example, dimer acids. The inks may also include therein trimer acids, or mixtures of trimer and dimer acids wherein there is present from about 10 to about 97 percent by weight of the dimer acid, and from about 90 to about 3 percent by weight of the trimer acid. Moreover, there can be incorporated into the ink compositions of the present invention dyes, dispersing agents such as surfactants, plasticizers, additives such as polyethylene glycols, and similar components providing the objectives of the present invention are achievable. An effective ratio of sponge material to ink composition is selected providing the objectives of the present invention are achievable. Generally, however, in a preferred embodiment of the present invention about 30 to about 40 percent by weight of sponge material is selected, and about 60 to about 70 percent by weight of ink composition is dispersed therein.

As pigment particles usually present in an amount of from about 1 percent by weight to about 10 percent by weight of the final coating solution composition, and preferably from about 2 to about 5 percent by weight, there can be utilized, for example, carbon black, including Raven 3500®, red, brown, green, cyan, blue, magenta, yellow and mixtures thereof. Specific examples of cyan, magenta and yellow pigments include Hudson Blue B13059 available from Paul Uhlich & Company, Inc.; Phthalocyanine Blue G-NCNF available from BASF Wyandotte; DCC 2734 Lithol Rubine available from Dominion Colour Company Ltd.; DCC 1232 Diarylide Yellow AAMX, available from Dominion Colour Company Ltd; and other similar pigments.

Additionally, there can be incorporated into the final coating solution compositions of the present invention in an amount of from about 2 to about 15 percent of black dyes, particularly those available from Paul Uhlich & Company, Inc. as Black Paste 9744 or Black Paste 9745. These black pastes, which are believed to be solutions of color bases in oleic acid in a ratio of 1:1.5 to about 1:2, enable a black color to be imparted to the resulting ink compositions, which compositions are usually brownish black; and increases the covering power of the ink, thus also increasing the overstrike capacity of the ribbon.

An important component for the inks of the present invention are Emery fatty acids, especially dimer acids. Examples of these acids, usually present in the final coating solution in an amount of from about 3 percent by weight to about 15 percent by weight, and preferably from about 5 percent by weight to about 10 percent by weight include Emersol 233LL Oleic acid, Empol 1010 Dimer acid, Empol 1024 Dimer acid, all available from Emery Industries, Inc., and the like. There can also be selected mixtures of trimer, and dimer acids in an amount of from about 50 to about 100 percent of the percentage of the fatty acid, together with oleic acid present in an amount of from zero to about 50 percent by weight, which mixtures are commercially available from Emery Industries, Inc. Moreover, the dimer acids, particularly the commercially available Empol 1024, are believed to be comprised of 75 percent by weight of dimer acids, and 25 percent by weight of trimer acids, however, other percentages of these components can be selected including Empol 1010 which is believed to contain 97 percent by weight of dimer acid, and 3 percent by weight of trimer acid. These dimer and trimer acids permit high viscosity inks of from about 5,000 to about 25,000 centipoise, for example.

Other additives can be incorporated into the ink compositions of the present invention including dispersant agents, which are present in an amount of from about 1 percent by weight to about 5 percent by weight, thereby decreasing the amount of dimer acid present by a corresponding amount, such dispersing agents including those illustrated herein. Specific preferred dispersing agents are Witco Chemical Petromix #9, a sulfonated hydrocarbon. Other additives can be incorporated into the ink compositions inclusive of, for example, polyethylene, and propylene glycols with a weight average molecular weight of from about 100 to about 1,500 present in an amount of from about 1 to about 5 percent by weight in the final coating solution primarily for the purpose of increasing the affinity of the inks for paper, and providing for smudge, or smear resistance of the characters printed.

Generally, the coating compositions are prepared by admixing the ink composition comprised of the dimer acid, or mixtures thereof as illustrated herein, and pigment particles with a polymer solution in a ratio of from about 4 parts polymer solution to about 1 part ink composition; and wherein the polymer solution is comprised of a polymer, about 10 to about 25 percent by weight, in a solvent such as methyl ethyl ketone, toluene, or acetone. More specifically, the inks of the present invention are prepared by the simple mixing of, for example, 30 parts by weight of a solvent, such as aliphatic hydrocarbons, inclusive of methyl ethyl ketone, and 70 parts by weight of the ink components, followed by dispersing in an attritor for an effective period of time, for example, from about 1 to about 4 hours. Thereafter, a polymer solution is formulated by dissolving one part of the polymer in about 6 parts of a solvent such as methyl ethyl ketone, acetone, toluene, or mixtures thereof; and this solution is mixed with the aforementioned prepared ink for an effective period of time, from about 15 to about 30 minutes, resulting in an ink coating solution that can be selected for the typewriter ribbons illustrated herein, which solution contains from about 2 parts of ink and one part of polymer in 7 parts of the solvent. The aforementioned solution is coated on a supporting substrate, such as Mylar polyesters, which subsequent to drying form a sponge with a thickness of from about 0.5 to about 1.5 mils. Thereafter, typewriter ribbons are formed by slitting the sponge formed into spools, 3/16 of an inch wide, and 400 feet in length.

These spools can then be inserted in various quiet typewriter prototypes including those illustrated in copending applications U.S. Ser. Nos. 751,169; (now U.S. Pat. No. 4,681,469) 751,167; (now U.S. Pat. No. 4,668,112) 751,335; now abandoned 751,349; (now U.S. Pat. No. 4,678,355) 804,955; (now U.S. Pat. No. 4,686,900) and 811,062, (now U.S. Pat. No. 4,673,305) the disclosures of each of these applications being totally incorporated herein by reference.

In another important feature of the present invention, there are provided multistrike ribbon formulations comprised of dimer acids. More specifically, the multistrike ribbon formulations can be comprised of substantially the identical components as illustrated herein with reference to the ink composition. Multistrike ribbon formulations encompassed within the scope of the present invention include those comprised of pigment particles, dimer acids, black paste, and oleic acids. Further, there can be incorporated into these formulations other additives such as polyethylene glycols, dispersants, and toluene. One specific preferred multistrike ribbon formulation is comprised of from about 10 to about 14 percent by weight of carbon black Raven 3500 available from Columbian Chemical Company; from about 12 to about 14 percent by weight of 1010 Dimer Acid available from Emery Industries, Ltd.; Oleic Acid 233LL available from Emery Industries, Ltd.; Black Paste 9744, a modified Induline-Oleic acid mixture available from Paul Uhlich Company, Petromix No. 9 available from Witco Chemical Company, which is believed to be a sulfonated hydrocarbon and functions as a dispersing agent; Polyethylene Glycol E-400, and Polyglycol E-1400 available from Dow Chemical, about 6 to about 8 percent by weight, which functions as humectant and improves smudge resistance; and about 25 to 30 percent by weight of toluene; and wherein the aforementioned mixture is admixed with a solution of polymers, such as VYHH polymer dissolved in methyl ethyl ketone.

Furthermore, in accordance with the present invention there are provided processes for obtaining typewriter ribbons. More specifically, in accordance with the present invention there is selected for the process one solvent such as an aliphatic solvent inclusive of methyl ethyl ketone to enable multistrike typewriter ribbons with a substantial number of pores, and excellent pore density. Thus, the process of the present invention comprises the following steps.

The first step is the preparation of the ribbon ink coating solution in which about 50 percent to about 80 percent represents the carbon black, oleic or dimer acids, and the other ink components described in the present patent application, and 20 percent to about 50 percent represents a solvent such as methyl ethyl ketone or toluene in order to reduce the viscosity of the ink during processing; and to ease its processability and its grinding efficiency are dispersed using any one method such as attrition, ball milling, three roll milling, and the like. The temperature of the slurry should be kept around ambient conditions, low enough to avoid the evaporation of the fugitive solvent, but high enough to avoid water condensation in the final ink. Thereafter, a polymer matrix solution is prepared separately with from about 10 percent to about 40 percent of polymer in a solvent or in a solvent mixture of, for example, from about 50 to about 100 percent by weight of an aliphatic hydrocarbon such as methyl ethyl ketone, and from about 0 to about 50 weight percent of an aromatic component such as toluene. Subsequently, the two solutions are mixed at an ink solids to polymer ratio of about 3 to 1 to about 1.5 to 1 until a homogeneous coating mixture is obtained. The coating solution is then coated on a polyester film base in a dry coating thickness of 0.5 to about 1.5 mils thick. Of importance with respect to the aforementioned process is the time that the coating is subjected to drying conditions for the primary purposes of removing the solvent therefrom, and enabling formation of the final ribbon sponges, which time is generally between about 5 seconds and 60 about seconds in a drying oven. Generally, the temperature of the drying oven is from about 75 to about 300° F.

The invention will now be described in detail with reference to specific preferred embodiments thereof, it being understood that these examples are intended to be illustrative only. Also, the invention of the present application is not intended to be limited to the materials, conditions, or process parameters recited herein; it being noted that all parts and percentages are by weight unless otherwise indicated.

EXAMPLE I

An ink composition was prepared in a 15S (2.5 U.S. gallons capacity) attritor available from Union Process Company, Akron, Ohio. The attritor was charged with 390 grams of Raven 3500® carbon black available from Columbian Chemical Company; 728 grams of Neptune Black X14 available from BASF Wyandotte Corporation; 728 grams of 1010 Dimer Acid available from Emery Industries, Ltd.; 229 grams of Polyglycol E-400 available from Dow Chemical Company; and 845 grams of toluene available from Shell Company. Cooling water with a temperature of 50° F. was circulated in the attritor's jacket at a flow rate of 1 gallon/minute and the mixture was milled for 2 hours. The temperature of the slurry increased to 126° F. during the milling time.

EXAMPLE II

A coating solution was then prepared by mixing for 30 minutes 2,500 grams of the ink obtained by the process of Example I with 7,396 grams of a 15 percent solution of Union Carbide VYHH copolymer dissolved in methyl ethyl ketone, available from Shell Chemical Company.

EXAMPLE III

The solution of Example II was then coated on a 12 inch wide roll of E.I. duPont 30TR Mylar on a pilot coater using a reverse roll applicator which applied an approximately 2 mil thick layer of solution. The web velocity was maintained at a speed of 18 feet per minute which allowed the solvent to slowly evaporate from the film in an undisturbed area for about 25 seconds before it reached the drying oven. The dried, coated film comprised of the supporting substrate and the spongy ink layer was 1.15 mil in thickness.

EXAMPLE IV

The coated film of Example III was then slit into ribbons 3/16 inch wide and these were wound onto spools in 400 foot lengths using a Dusenbury Model 618-AF Ribbon Slitter. Thereafter, the spool was inserted into a quiet typewriter prototype as detailed in the copending applications indicated herein, especially U.S. Ser. No. 751,169, the disclosure of which has been totally incorporated herein by reference. There resulted excellent prints of a uniform density of from 1.0 to 1.4 o.d. (optical density units). The overstrike capacity of the ribbon was determined to be 6X using the industry standard stalled character test.

EXAMPLE V

A Union Process 15S attritor was charged with 4,200 grams of Raven 3500® carbon black, 7,840 grams of the 1010 dimer acid of Example I, 7,840 grams of Neptune Black X-14, 2,240 grams of Polyglycol E-400, and 9,030 grams of methyl ethyl ketone. The slurry was attrited for 2 hours while maintaining the temperature in the attritor at 18° to 20° C.

EXAMPLE VI

Ten thousand (10,000) grams of the ink of Example V was mixed with 25,450 grams of a 15.5 percent solution of VYHH polymer of Example II in methyl ethyl ketone, and the resultant solution was coated on E.I. duPont 30TR Mylar by repeating the procedure of Example III. There resulted an ink sponge ribbon having a total thickness of 1.0 mil. This ribbon was then slit into 3/16 inch wide by 400 foot long ribbon spools and evaluated with a Xerox Corporation 630 printer. The ribbon produced uniform characters of 1.0 to 1.4 o.d. units and was determined to have an overstrike capacity of 10X as determined by the industry standard stalled character test.

EXAMPLE VII

A coating solution was prepared as follows: 10,000 grams of the ink of Example V was mixed with 25,450 grams of a 15.5 percent solution of the VYHH copolymer in methyl ethyl ketone in a 1:1 mixture of methyl ethyl ketone and toluene.

EXAMPLE VIII

A sample of the coating solution of Example VII was hand coated onto a sheet of E.I. duPont 30TR Mylar using an applicator with a 5 mils gap. Thereafter, the coating was dried under ambient conditions to yield a ribbon sponge with a total thickness of 1.10 mil. A 3/16 inch wide by 6 inch long strip was cut from this ribbon and was spliced into the ribbon spool of a Xerox Corporation 630 printer. This spliced in ribbon produced uniform characteristics of between 1.0 and 1.4 o. d. units. The overstrike capacity of the ribbon was determined to be 8X with the known stalled character test.

The coating solution of Example VII was then coated on 28R Lumirror polyester, available from Toray Industries, by repeating the procedure of Example III. The resulting coated film was slit into ribbons in accordance with the process described in Example VII. Subsequent to evaluation, there resulted print characteristics substantially similar to those of Example VIII.

Although the invention has been described with reference to specific preferred embodiments, it is not intended to be limited thereto. Rather, those skilled in the art will recognize variations, and modifications may be made therein which are within the spirit of the invention and within the scope of the following claims.

What is claimed is:

1. An impact printing ribbon comprised of a supporting substrate and a sponge with an ink composition dispersed therein, which ink is comprised of pigment particles and a dimer acid.

2. An impact printing ribbon in accordance with claim 1 wherein the sponge is a polymer selected from the group consisting of polystyrene, polyacrylates, polyesters, polyvinyl chloride-polyvinyl acetate copolymers, polyamides, and polyvinyl acetate polystyrene copolymers.

3. An impact printing ribbon in accordance with claim 2 wherein the polymer is present in an amount of from about 25 percent by weight to about 45 percent by weight.

4. An impact printing ribbon in accordance with claim 1 wherein the pigment particles are carbon black.

5. An impact printing ribbon in accordance with claim 1 wherein the pigment particles are present in an amount of from about 5 to about 20 percent by weight of the ink.

6. An impact printing ribbon in accordance with claim 1 wherein the pigment particles are present in an amount of from about 10 percent by weight to about 15 percent by weight.

7. An impact printing ribbon in accordance with claim 1 wherein the dimer acid is present in an amount of from about 10 percent by weight to about 25 percent by weight.

8. An impact printing ribbon in accordance with claim 1 wherein the viscosity of the ink composition is from about 5,000 centipoise to about 25,000 centipoise.

9. An impact printing ribbon in accordance with claim 1 wherein the pigment particles are selected from the group consisting of red, brown, green, cyan, magenta, yellow, and mixtures thereof.

10. An impact printing ribbon in accordance with claim 1 wherein the ink further includes therein dyes.

11. An impact printing ribbon in accordance with claim 10 wherein the dye is present in an amount of from about 5 percent by weight to about 20 percent by weight of the ink components.

12. An impact printing ribbon in accordance with claim 1 wherein the ink composition further includes therein dispersing agents.

13. An impact printing ribbon in accordance with claim 12 wherein the dispersing agent is present in an amount of from about 1 percent by weight to about 10 percent by weight.

14. An impact printing ribbon in accordance with claim 12 wherein the dispersant is a metallic salt.

15. An impact printing ribbon in accordance with claim 1 wherein the ink composition further includes therein polyalkylene glycols.

16. An impact printing ribbon in accordance with claim 1 wherein the ink includes therein a mixture of dimer and trimer acids.

17. An impact printing ribbon in accordance with claim 15 further including therein a dye.

18. An impact printing ribbon in accordance with claim 21 wherein the dye is present in an amount of from about 20 to about 40 percent by weight.

19. An impact printing ribbon in accordance with claim 1 wherein the supporting substrate comprises a polyester.

20. An impact printing ribbon in accordance with claim 1 wherein the sponge containing the ink is present in a layer of from about 0.5 to about 1.5 mils in thickness.

* * * * *